US008701987B2

(12) United States Patent
Albers et al.

(10) Patent No.: US 8,701,987 B2
(45) Date of Patent: Apr. 22, 2014

(54) TRANSACTION PRODUCT WITH PADDLE

(75) Inventors: Chad Albers, Minneapolis, MN (US); Robert Jerome Weaver, Hugo, MN (US); Melissa M. Andrykowski, Minneapolis, MN (US); Marta Harding, Minneapolis, MN (US); Jessica D. Albrecht, Woodbury, MN (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 329 days.

(21) Appl. No.: 13/171,556

(22) Filed: Jun. 29, 2011

(65) Prior Publication Data

US 2012/0323823 A1 Dec. 20, 2012

Related U.S. Application Data

(60) Provisional application No. 61/498,372, filed on Jun. 17, 2011.

(51) Int. Cl.

| | |
|---|---|
| ***G06K 5/00*** | (2006.01) |
| ***G07F 7/10*** | (2006.01) |
| *G07F 7/08* | (2006.01) |
| *A63B 59/00* | (2006.01) |
| *A63B 59/04* | (2006.01) |
| *G06Q 99/00* | (2006.01) |

(52) U.S. Cl.

CPC ................ *G07F 7/1008* (2013.01); *G07F 7/08* (2013.01); *A63B 59/0092* (2013.01); *A63B 59/04* (2013.01); *G06Q 99/00* (2013.01)

USPC ........... 235/380; 235/381; 473/521; 473/527; 705/500

(58) Field of Classification Search

CPC ..................................................... G07F 7/1008

See application file for complete search history.

(56) References Cited

U.S. PATENT DOCUMENTS

| | | | | |
|---|---|---|---|---|
| 1,928,583 | A * | 9/1933 | Young et al. | 273/330 |
| 2,009,698 | A * | 7/1935 | Marx | 273/330 |

(Continued)

FOREIGN PATENT DOCUMENTS

| | | |
|---|---|---|
| GB | 2277482 A | 4/1993 |

OTHER PUBLICATIONS

Translation of EP 0727362 to Jean-Noel Nicolazic Presentation and packaging device for sporting articles like table tennis bats. pp. 1-5.*

(Continued)

*Primary Examiner* — Brett Feeney

(74) *Attorney, Agent, or Firm* — Griffiths & Seaton PLLC; JoAnn M. Seaton

(57) ABSTRACT

A transaction product includes a paddle, a string, a ball, and an account identifier. The paddle defines an enlarged portion and an elongated handle extending from the enlarged portion. The paddle is formed as a single piece of material. The string defines a first end and a second end opposite the first end. The first end of the string is coupled to the paddle. The ball is coupled to the second end of the string and is configured to bounce on the paddle. The account identifier is statically connected to the paddle and links the paddle to at least one of an account and a record and is machine readable by a point-of-sale terminal.

21 Claims, 13 Drawing Sheets

(56) References Cited

U.S. PATENT DOCUMENTS

| | | | | | |
|---|---|---|---|---|---|
| 2,047,744 | A * | 7/1936 | Paul et al. | 273/330 |
| 2,131,550 | A * | 9/1938 | Collins | 273/330 |
| 2,622,880 | A * | 12/1952 | Walsh | 273/330 |
| D226,206 | S | 1/1973 | Rankin et al. | |
| 3,879,035 | A * | 4/1975 | Danchulis et al. | 473/527 |
| 3,879,250 | A * | 4/1975 | Rankin, Jr. | 156/228 |
| 4,516,774 | A | 5/1985 | Nankivell | |
| D338,897 | S | 8/1993 | Buschbom | |
| 5,249,810 | A * | 10/1993 | Cazalet | 273/330 |
| D359,780 | S | 6/1995 | Sokol et al. | |
| 5,777,305 | A | 7/1998 | Smith et al. | |
| 5,951,014 | A | 9/1999 | Nadel | |
| D445,147 | S | 7/2001 | Saldana | |
| D451,559 | S * | 12/2001 | Miles | D21/466 |
| D505,450 | S | 5/2005 | Lauer et al. | |
| 7,004,398 | B1 * | 2/2006 | Francis et al. | 235/486 |
| 7,024,807 | B2 | 4/2006 | Street | |
| D523,076 | S | 6/2006 | Lauer et al. | |
| 7,055,740 | B1 * | 6/2006 | Schultz et al. | 235/381 |
| D537,483 | S | 2/2007 | Kort et al. | |
| D539,369 | S | 3/2007 | Makowsky | |
| 7,234,639 | B2 | 6/2007 | Schultz et al. | |
| 7,264,155 | B2 | 9/2007 | Halbur et al. | |
| 7,275,683 | B2 | 10/2007 | Lazarowicz et al. | |
| 7,278,570 | B2 * | 10/2007 | McGee et al. | 235/380 |
| 7,316,357 | B2 | 1/2008 | Lindahl et al. | |
| 7,360,710 | B2 | 4/2008 | Lindahl et al. | |
| 7,376,564 | B2 | 5/2008 | Selg et al. | |
| 7,500,604 | B2 * | 3/2009 | Holme | 235/380 |
| 7,559,479 | B2 * | 7/2009 | McGee et al. | 235/486 |
| 7,591,418 | B2 | 9/2009 | Halbur et al. | |
| 7,661,588 | B2 * | 2/2010 | Porvaznik et al. | 235/380 |
| 7,717,335 | B2 | 5/2010 | Halbur et al. | |
| D616,932 | S | 6/2010 | Albers et al. | |
| 8,091,781 | B2 | 1/2012 | Albrecht et al. | |
| 2002/0038772 | A1 * | 4/2002 | Blaustein et al. | 206/362.2 |
| 2002/0088855 | A1 | 7/2002 | Hodes | |
| 2002/0143697 | A1 | 10/2002 | Gotfried | |
| 2003/0134702 | A1 * | 7/2003 | Cooper | 473/521 |
| 2005/0287903 | A1 * | 12/2005 | Augborne | 446/75 |
| 2006/0157554 | A1 * | 7/2006 | Halbur et al. | 235/380 |
| 2006/0161439 | A1 * | 7/2006 | Selg et al. | 704/270 |
| 2006/0231609 | A1 * | 10/2006 | Lazarowicz et al. | 235/380 |
| 2006/0261558 | A1 * | 11/2006 | Bazinet | 273/330 |
| 2007/0241197 | A1 * | 10/2007 | Lindahl et al. | 235/487 |
| 2007/0266605 | A1 * | 11/2007 | Halbur et al. | 40/674 |
| 2008/0078832 | A1 * | 4/2008 | Halbur et al. | 235/380 |
| 2008/0119952 | A1 | 5/2008 | Smith et al. | |
| 2008/0167145 | A1 * | 7/2008 | Madzuma | 473/527 |
| 2009/0308920 | A1 * | 12/2009 | Holt et al. | 235/379 |
| 2010/0110274 | A1 * | 5/2010 | Reynolds et al. | 348/360 |
| 2010/0155490 | A1 * | 6/2010 | Halbur et al. | 235/487 |
| 2010/0325037 | A1 | 12/2010 | Halbur et al. | |
| 2011/0021106 | A1 * | 1/2011 | Halbur et al. | 446/71 |
| 2011/0101090 | A1 | 5/2011 | Halbur et al. | |
| 2011/0106697 | A1 | 5/2011 | Roberts et al. | |
| 2011/0168597 | A1 * | 7/2011 | Titros et al. | 206/495 |
| 2012/0130892 | A1 * | 5/2012 | Ronayne | 705/41 |

OTHER PUBLICATIONS

ARMU Products. Paddle Balls. Webarchive Dec. 7, 2006.*

Bizpen. Paddle Ball. Webarchive Aug. 18, 2009.*

"Contactless Payments: Consumer Trends and Usage Preferences," firstdata.com, 2008 (2 pages).

"Peel-A-Deal® Bar Coded Card," http://www.peeladeal.com/products.php?code=pad_barcode&prod=Bar%20Coded%20Card, available at least as early as Aug. 27, 2009 (3 pages).

Office Action from Canadian Patent Application No. 2,763,763, mailed Jan. 3, 2013 (3 pages).

Will Wade, "First Data Sees Sticker Device as Mobile-Pay Bridge," American Banker, Aug. 25, 2008, 2 pages.

Century Novelty, "4½" Smile Paddleball Game," http://www.centurynovelty.com/detail_316_163-359.html?mr:referralID=afd4cc9e-e707-11df-ad8e-001b2166c62d, as printed on Nov. 3, 2010, 2 pages.

Dollar Tree, "Light Up Plastic Paddle Balls," http://www.dollartree.com, as printed on Nov. 3, 2010, 2 pages.

First Data, "GO-Tag™ Solution," http://www.firstdata.com, 2008, 2 pages.

"Power Rangers Tennis Bat & Ball Set, and Beach Ball with Rucksack Bag", http://www.charactermad.com/power-rangers-tennis-bat-ball-set-and-beach-ball-with-rucksack-bag-3903.html, as printed on Jun. 13, 2011, 2 pages.

U.S. Appl. No. 12/647,111, filed Dec. 24, 2009, entitled "Transaction Product With Lens," 49 pages.

Office Action from Canadian Patent Application No. 2,763,763, mailed May 17, 2012 (3 pages).

* cited by examiner

TRANSACTION PRODUCT WITH PADDLE

CROSS-REFERENCE TO RELATED APPLICATIONS

This non-provisional application claims the benefit under 35 U.S.C. §119(e) to U.S. Provisional Patent Application No. 61/498,372, filed Jun. 17, 2011, which is incorporated herein in its entirety.

BACKGROUND OF THE INVENTION

Stored-value cards and other transaction products come in many forms. A gift card, for example, is a type of transaction product that includes a pre-loaded or selectively loaded monetary value. In one example, a consumer buys a gift card having a specified value for presentation as a gift to another person. In another example, a consumer is offered a gift card as an incentive to make a purchase. A gift card, like other transaction cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction cards provide a number of advantages to both the consumer and the retailer.

SUMMARY OF THE INVENTION

One aspect of the present invention relates to a transaction product including a paddle, a string, a ball, and an account identifier. The paddle defines an enlarged portion and an elongated handle extending from the enlarged portion. The paddle is formed as a single piece of material. The string defines a first end and a second end opposite the first end. The first end of the string is coupled to the paddle. The ball is coupled to the second end of the string and is configured to bounce on the paddle. The account identifier is statically connected to the paddle and links the paddle to at least one of an account and a record and is machine readable by a point-of-sale terminal. Stored-value cards, methods of providing a transaction card, and other embodiments of stored-value or transaction cards and associated combinations are also disclosed.

BRIEF DESCRIPTION OF THE DRAWINGS

Embodiments of the invention will be described with respect to the figures, in which like reference numerals denote like elements, and in which.

DETAILED DESCRIPTION

Figure 1:
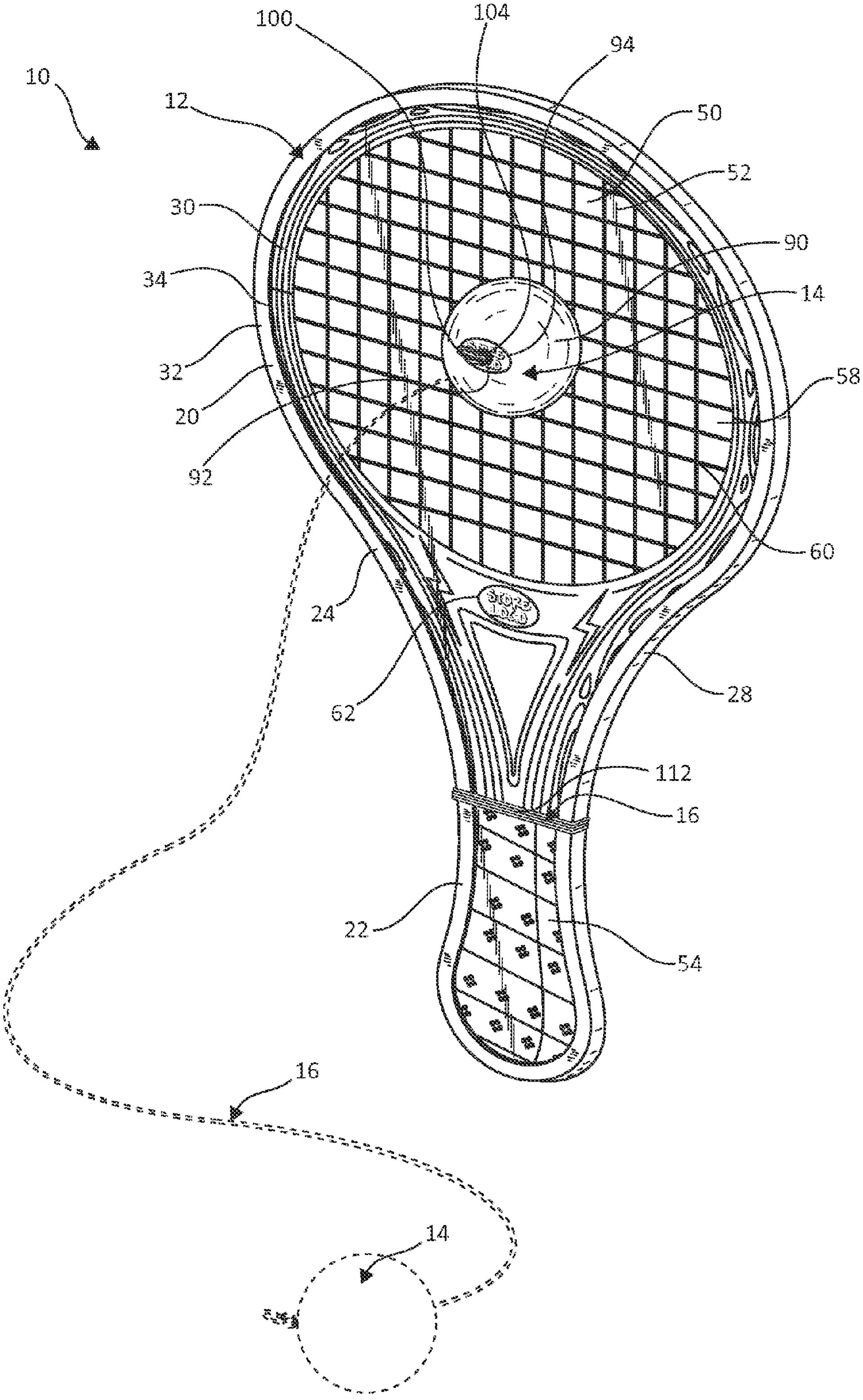
FIG. 1 is a front, perspective view illustration of a transaction product, according to one embodiment of the present invention.

The following detailed description of the invention provides examples and is not intended to limit the invention or the application and uses of the invention. Furthermore, there is no intention to be bound by any theory presented in the preceding background of the invention or the following detailed description of the invention.

A stored-value card assembly or other transaction product assembly is adapted to facilitate making purchases of goods and/or services at, for example, a retail store or web site. According to one embodiment, an original consumer buys a transaction product assembly to give a recipient who in turn is able to use at least a portion of the transaction product assembly to pay for goods and/or services. A transaction product assembly, according to embodiments of the present invention, provides the consumer and recipient with extra amusement and functionality in addition to the ability to pay for goods and/or services with the associated transaction product assembly.

In particular, according to one embodiment, the transaction product assembly includes a transaction card or other transaction product having both a financial functionality and a novelty or amusing functionality, such as to amuse the bearer of the transaction product trying to hit a ball off a paddle in as many successive times as possible as further described below. In one embodiment, transaction product assembly is packaged in a manner substantially enclosing the transaction product such that the features of the transaction product are displayed to potential consumers in a manner encouraging purchase of the transaction product assembly. In one embodiment, the amusing aspect of the transaction product assembly promotes sale, use, and/or loading of the transaction product by potential consumers and/or bearers of the transaction product assembly.

Turning to the figures, FIGS. 1-7 illustrate various views of one embodiment of a transaction product 10 including a paddle 12, a ball 14, and a string 16. The transaction product 10 facilitates purchase of retail items and/or is configured to be applied toward use of pre-stored calling minutes, etc. In one embodiment, ball 14 is rubber or otherwise a bouncy ball coupled to paddle 12 via string 16, which, in one example, is elastomeric. A bearer is able to unsecure string 16 from around paddle 12, as generally illustrated in FIGS. 1-7, to move ball 14 away from paddle 12 as generally indicated in dashed lines in FIG. 1. The bearer, then, is able to try to hit ball 14 with paddle 12 (i.e., bounce ball 14 off of paddle 12) as many times in succession as possible. As such, paddle 12 is one example of means for deflecting ball 14 causing ball 14 to bounce when ball 14 impacts paddle 12. In one embodiment, string 16 generally prevents ball 14 from being separated from paddle 12 by more than a predetermined distance and enhances the difficulty of the game by ensuring ball 14 returns to paddle 12 in a quick manner following an impact of ball 14 on paddle 12. As such, string 16 is one example of means for tethering ball 14 to paddle 12.

A portion of transaction product 10, for example, paddle 12, includes at least one account activation area or account identifier 18, such as a bar code, magnetic strip, a smart chip, or other electronic device, a radio frequency identification (RFID) device or other suitable identifier readily machine readable by a point-of-sale terminal or other account access station or kiosk. Account identifier 18 indicates an account or record to which transaction product 10 is linked. The account or record of the monetary or other balance on transaction product 10 optionally is maintained on a remote database accessible by corresponding point-of-sale terminals, other electronic or manual record-keeping system or, in the case of "smart" cards for example, on a chip or other electronic device(s) on transaction product 10, itself. Accordingly, by scanning account identifier 18, the account or record linked to transaction product 10 is identified and can subsequently be activated, have amounts debited therefrom, and/or have amounts added thereto.

In one embodiment, account identifier 18 includes a character string or code 19 (e.g., a number and/or letter string) configured to provide additional security to the user of transaction product 10 and/or configured to be read by a bearer of transaction product 10 to facilitate use of transaction product 10 for web site or other purchases outside of brick-and-mortar type retail establishments. With the above in mind, account identifier 18 is one example of means for linking transaction product 10 with an account or record, and scanning of account identifier 18 is one example of means for activating or loading value on transaction product 10. Transaction product 10, for example, paddle 12, is one example of means for supporting account identifier 18.

In one embodiment, paddle 12 defines an enlarged portion 20 and a handle 22. Enlarged portion 20 is sized and configured for interacting with ball 14, and in one example, is generally round to form an end similar to an impact portion of a racquet, etc. Handle 22 extends from a side, e.g., the bottom of, enlarged portion 20. Handle 22 is elongated and narrow relative to enlarged portion 20 such that users can relatively easily grasp paddle 12 via handle 22. In one embodiment, paddle 12 is formed as a single piece of wood or plastic including both enlarged portion 20 and handle 22.

In one embodiment, paddle 12 defines a first or front surface 24 and a second or rear surface 26 opposite front surface 24 separated by a thickness of paddle 12. As illustrated, in one example, each of front surface 24 and rear surface 26 are partially formed by each of enlarged portion 20 and handle 22. A perimeter edge 28 extends around a substantial entirety of paddle 12, including enlarged portion 20 and handle 22, between, for example, substantially perpendicular to, each of front surface 24 and rear surface 25.

Paddle 12 is formed of any suitable substrate or combination of substrates. More specifically, in one embodiment, paddle 12 is a substantially planar member formed of plastic (e.g. polycarbonate, polystyrene, polyvinyl chloride (PVC), acrylonitrile butadiene styrene (ABS), polyethylene terephthalate (PET), teslin, polyactide (PLA), or acrylic), a composite, or other suitable material. In one embodiment, paddle 12 is molded from plastic; while in other embodiments, paddle 12 is formed in any other suitable planar or non-planar configuration as will be apparent to those of skill in the art upon reading this application, e.g., formed of wood.

Figure 2:
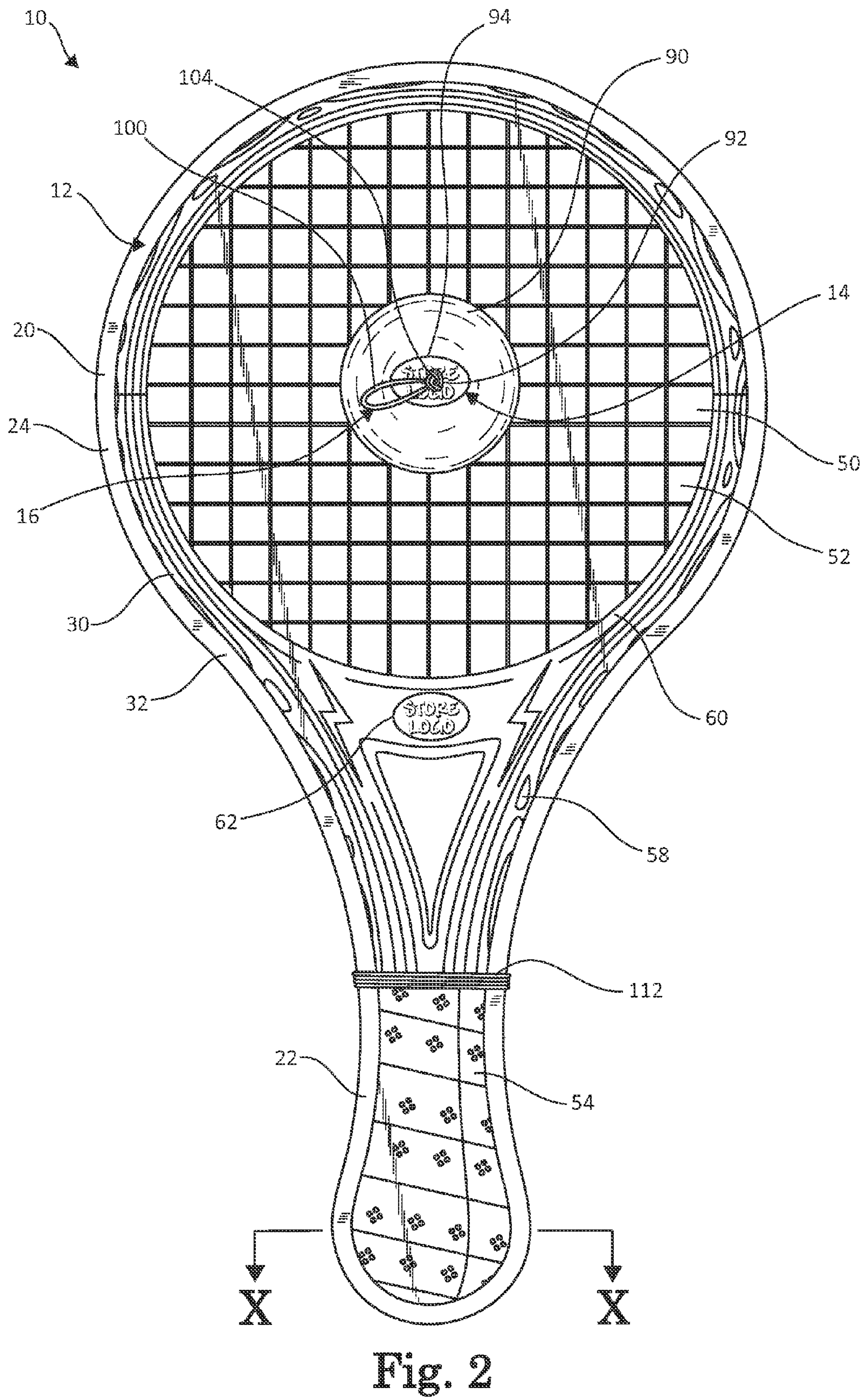
FIG. 2 is a front view illustration of the transaction product of FIG. 1, according to one embodiment of the present invention.
Figure 9:
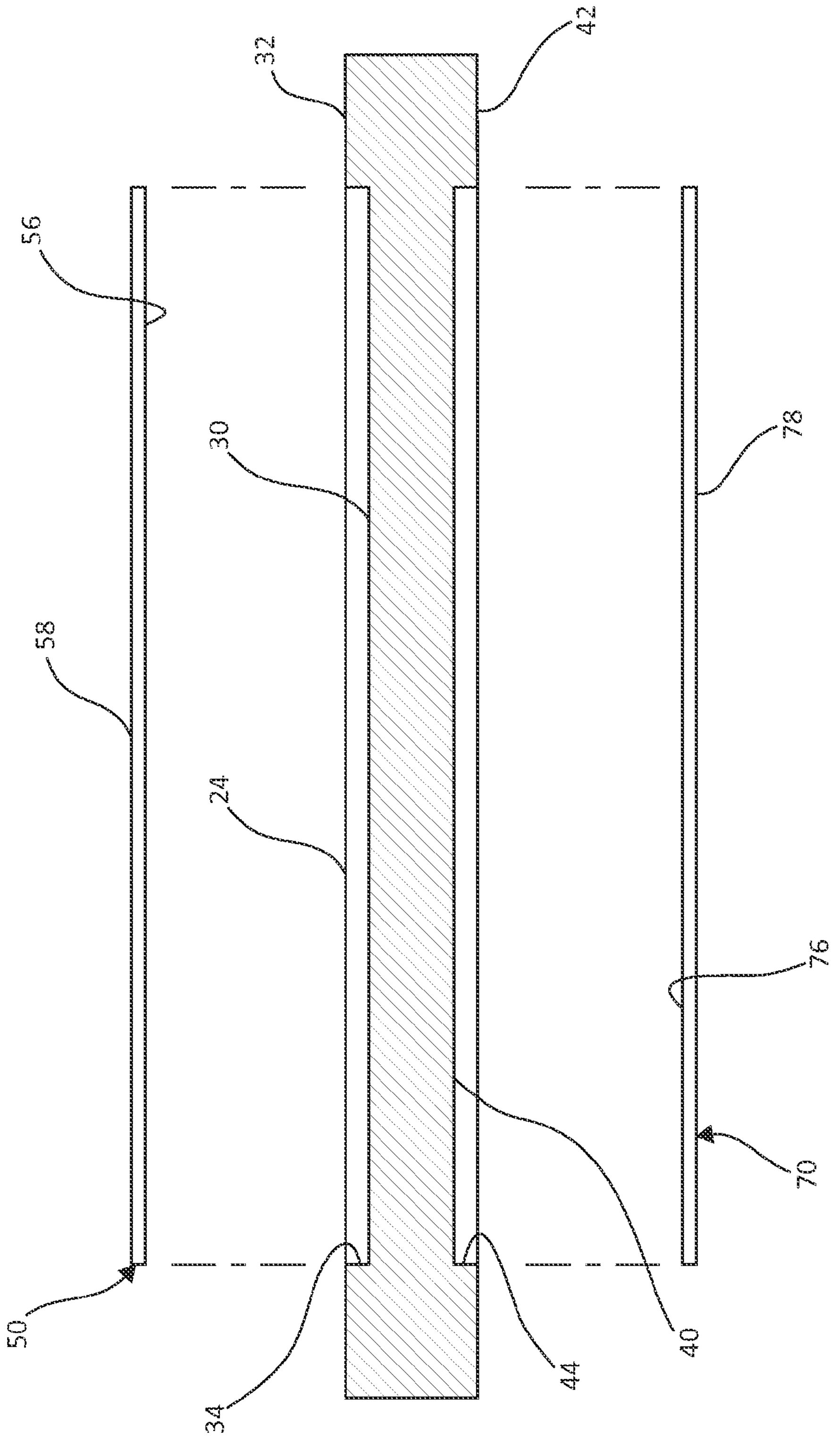
FIG. 9 is an exploded, cross-sectional view illustration of the transaction product taken along line X-X in FIG. 2, according to one embodiment of the present invention.

Additionally referring to the exploded, cross-sectional view illustration of FIG. 9 taken along the line X-X in FIG. 2, in one embodiment, front surface 24 of paddle 12 includes a major, substantially planar section 30, a rim 32, and an offset 34. Major, substantially planar section 30 forms the majority of front surface 24 and is the center of and shaped similarly to, but slightly smaller than, the entire front surface 24. Rim 32 extends around a substantial entirety of the perimeter of major, substantially planar section 30. Rim 32 extends in front of major, substantially planar section 30 (i.e., farther away from rear surface 26) such that offset 34 is formed extending from an inner edge of rim 32 rearwardly to an outer edge of major, substantially planar section 30. As such, a recess is formed across major, substantially planar section 30 bound by rim 32. In one embodiment, rim 32 has an outer shape coterminous and substantially identical to the outer shape of paddle 12 considered as a whole. In one embodiment, each of major, substantially planar section 30, rim 32, and offset 34 extend and define a part of enlarged portion 20 and handle 22 of paddle 12.

Rear surface 26 is formed similar to front surface 24, in one example, and defines a major, substantially planar section 40, a rim 42, and an offset 44 similar to major, substantially planar section 30, rim 32, and offset 34 of front surface 24. As such, a recess is formed across major, substantially planar section 30 bound by rim 32. In one example, paddle 12 is a first thickness between major, substantially planar section 30 of front surface 24 and major, substantially planar section 40 of rear surface 26 and a second thickness between rim 32 of first surface 24 and rim 42 of rear surface 26, where the second thickness is greater than the first thickness (see, e.g., FIG. 9). In one example, the first thickness is substantially greater than a difference between the first thickness and the second thickness, for example, at least two times greater, and in one embodiment, at least five times greater.

In one embodiment, paddle 12 defines an aperture 46 extending therethrough via each of major, substantially planar section 30 of front surface 24 and major, substantially planar section 40 of rear surface 26. Aperture 46 is sized just slightly larger than a diameter of string 16 to facilitate coupling of string 16 to paddle 12 as will be described in greater detail below. Paddle 12 may incorporate other additional or alternative features to facilitate string 16 attachment to paddle 12 as will be apparent to those of skill in the art upon reading the current application.

In one embodiment, transaction product 10 additionally includes a first or front panel 50 and/or a second or rear panel 70 each configured to be adhered to paddle 12, e.g., as stickers, as illustrated in FIGS. 1-9. More specifically, in one embodiment, front panel 50 is sized and shaped substantially identical to major, substantially planar section 30 of front surface 24 and, therefore, defines an enlarged portion 52 and a handle portion 54. Front panel 50 is relatively thin and substantially planar defining a first or rear surface 56 and a second or front surface 58 opposite rear surface 56. Rear surface 56 is coated in adhesive and/or is otherwise configured to be applied and secured to major, substantially planar section 30 of front surface 24 of paddle 12. Enlarged portion 52 and handle portion 54 of front panel 50 align with the part of major, substantially planar section 30 that partially forms enlarged portion 20 and handle 22 of paddle 12. In one embodiment, front panel 50 defines or is later punctured to define an aperture 64 through a center of enlarged portion 20 that aligns with aperture 46 of paddle 12.

Front surface 58 of front panel 50 includes decorative indicia 60 for paddle 12. For example, as illustrated, decorative indicia 60 are used to depict paddle 12 as a tennis or other racquet with a handle and webbed portion corresponding with handle 22 and enlarged portion 20 of paddle 12. Other decorative indicia 60 are also contemplated such as that indicia linking paddle 12 to a season, occasion, holiday, celebration, theme, character, movie, book, television show, etc. as will be apparent to those of skill in the art upon reading this application. In one embodiment, front panel 50 includes brand indicia 62, which, in one example, includes one or more of a logo, text, trademark, etc. that associate transaction product 10 with at least one of a product, a brand, a store, department, bank, etc. Front panel 50 is one example of means for displaying aesthetic enhancements to transaction product 10.

In one embodiment, rear panel 70 is sized and shaped substantially identical to major, substantially planar section 40 of rear surface 26 and, therefore, defines an enlarged portion 72 and a handle portion 74. Like front panel 50, rear panel 70 is relatively thin and substantially planar defining a first or front surface 76 and a second or rear surface 78 opposite front surface 76. Front surface 76 is coated in adhesive and/or is otherwise configured to be applied and secured to major, substantially planar section 40 of rear surface 26 of paddle 12. Enlarged portion 72 and handle portion 74 align with the parts of major, substantially planar section 40 that partially forms enlarged portion 20 and handle 22 of paddle 12. In one embodiment, rear panel 70 defines or is later punctured to define an aperture 84 through a center of enlarged portion 72 that aligns with aperture 46 of paddle 12.

In one example, rear surface 78 of rear panel 70 includes account identifier 18 and/or access code 19. In one embodiment, account identifier 18 includes a bar code printed to rear surface 78. As such, rear panel 70 is one example of means for supporting account identifier 18 or other means for linking transaction product 10 to an account or record.

In one embodiment, rear surface 78 of rear panel 70 includes decorative indicia 60, for example, decorative indicia 60 similar to or visually corresponding to decorative indicia 60 on front panel 50. Other decorative indicia 60 are also contemplated that visually link paddle 12 to a season, occasion, holiday, celebration, theme, character, movie, book, television show, etc. as will be apparent to those of skill in the art upon reading this application. In one embodiment, rear surface 78 of rear panel 70 also includes brand indicia 62.

Figure 3:
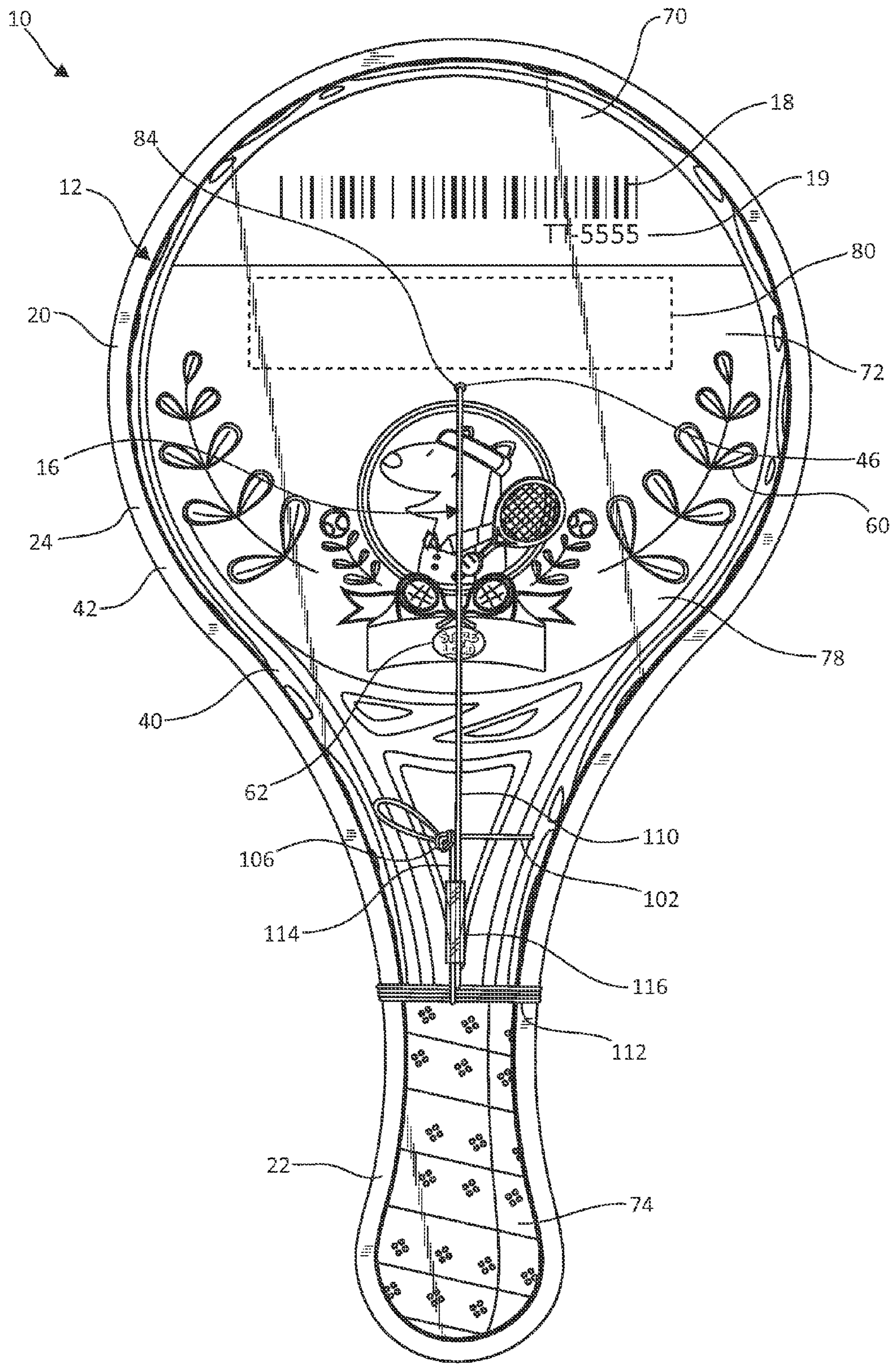
FIG. 3 is a rear view illustration of the transaction product of FIG. 1, according to one embodiment of the present invention.
Figure 4:
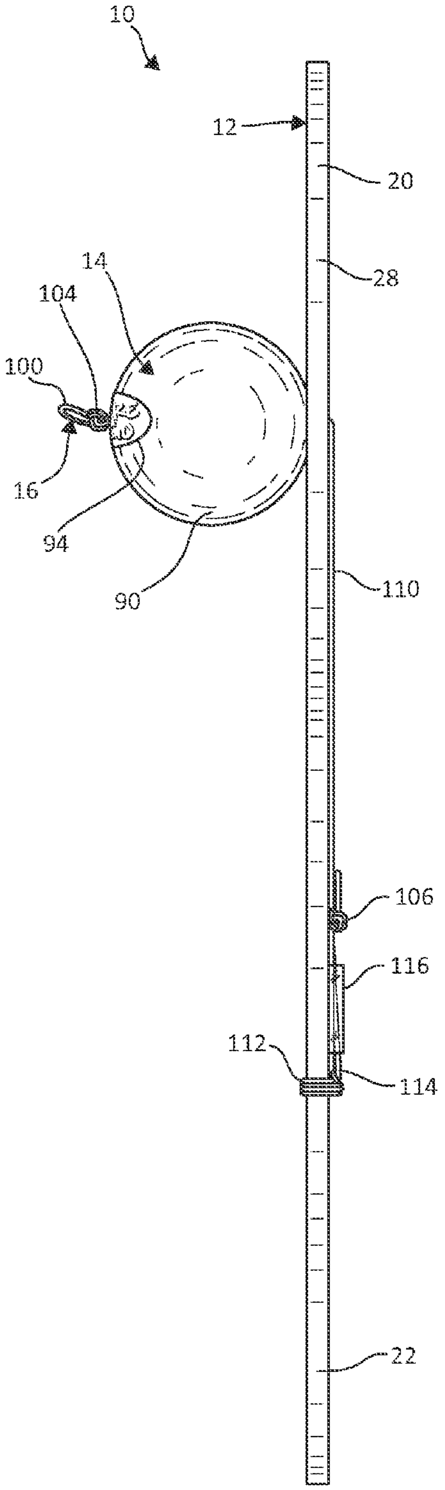
FIG. 4 is a right side view illustration of the transaction product of FIG. 1, according to one embodiment of the present invention.
Figure 5:
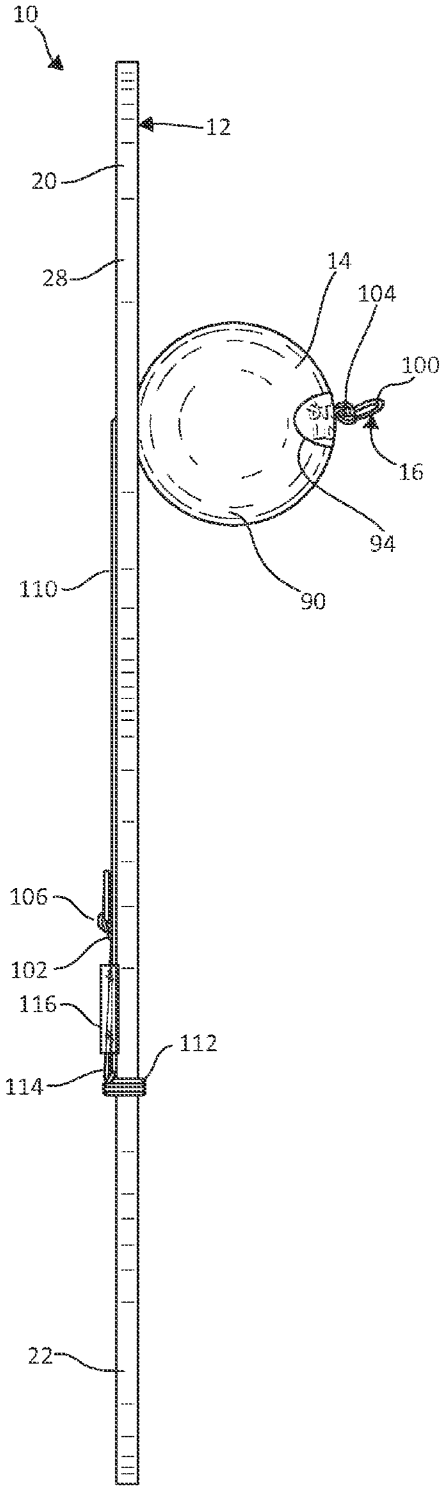
FIG. 5 is a left side view illustration of the transaction product of FIG. 1, according to one embodiment of the present invention.
Figure 6:
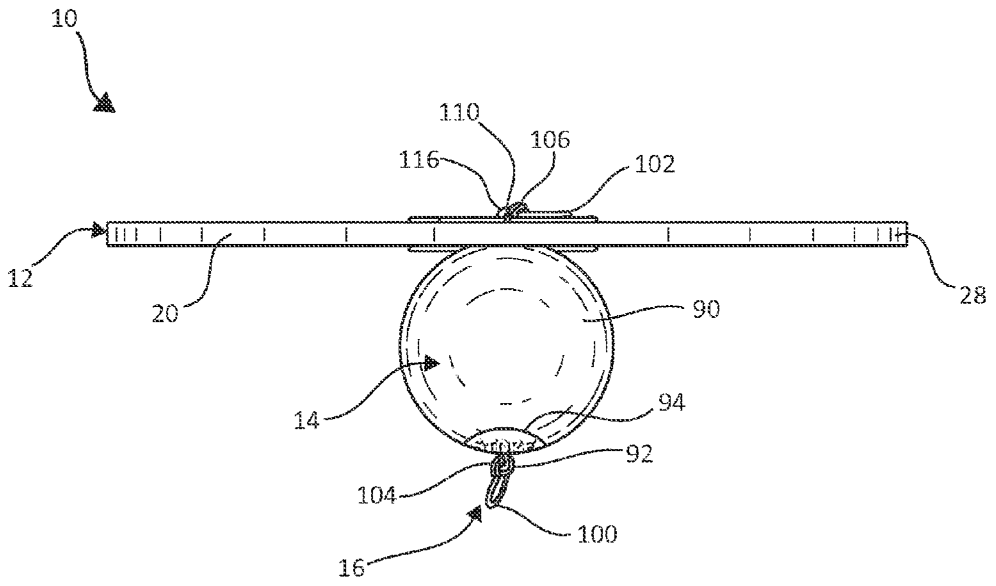
FIG. 6 is a top view illustration of a transaction product of FIG. 1, according to one embodiment of the present invention.
Figure 7:
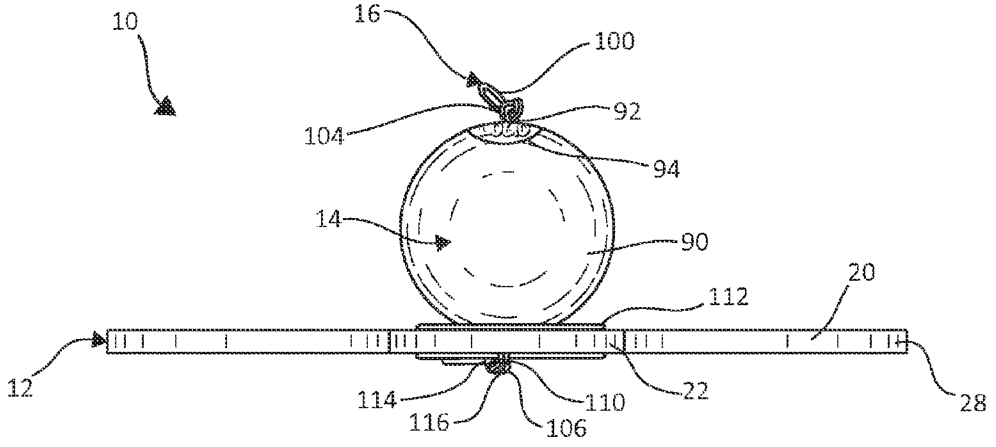
FIG. 7 is a bottom view illustration of the transaction product of FIG. 1, according to one embodiment of the present invention.

In one embodiment, transaction product 10 includes redemption indicia 80, generally indicated with a dashed box in FIG. 3, such as on rear surface 78 of rear panel 70. Redemption indicia 80 indicate that transaction product 10 is redeemable for the purchase of goods and/or services and that, upon use, a value of the purchased goods and/or services will be deducted from the account or record linked to transaction product 10. In one embodiment, redemption indicia 80 include phrases such as "<NAME OF STORE> GiftCard" and "This GiftCard is redeemable for merchandise or services at any of our stores or at our web site," and/or provides help or phone line information in the case of a lost, stolen, or damaged transaction product, etc. Notably, in one embodiment, one or more of indicia 60, 62, 80, and/or other indicia described as being on one of front surface 58 of front panel 50 or rear surface 78 of rear panel 70 are additionally or alternatively included on the other one of front surface 58 of front panel 50 and rear surface 78 of rear panel 70.

Ball 14 is configured to repeatedly bounce off paddle 12 and, in one embodiment, is formed of rubber. Ball 14 is sized appropriately relative to paddle 12. In one example, where paddle 12 has a width of about 3.75 inches at its widest dimension across enlarged portion 20, ball 14 is about 1 inch in diameter, however, a similar or smaller diameter ball may be used with the similarly sized, larger, or smaller paddles. Ball 14 is generally a sphere 90 in shape and defines a cavity or hole 92 extending entirely through a center of ball 14. In one example, brand indicia 94 similar to and/or corresponding with brand indicia 60 are included on ball 14, for instance, centered on an end of hole 92.

String 16, for example, formed of elastic, preferably has elastic properties allowing string 16 to stretch when ball 14 is hit by and travels away from paddle 12 in a manner that will limit a distance ball 14 can travel away from paddle 12. String 16 defines a first end 100 and a second end 102 opposite first end 100. First end 100 is tied to form a first knot 104 and second end 102 is thread through hole 92 of ball 14. First knot 104 generally prevents first end 100 of string 16 from inadvertently traveling through hole 92. Second end 102 of string 16 is thread through hole 92 in ball 14 to paddle 12 and is coupled thereto in any suitable manner. In one example, second end 102 of string 16 is thread through aperture 46 of paddle 12 and, in one embodiment, through one or both of apertures 64 and 84 in front and rear panels 50 and 70, respectively. In one embodiment, second end 102 of string 16 is tied into a second knot 106 on a rear side of rear surface 26 of paddle 12 such that second end 102 of string 16 will not pass back through aperture 46 without untying or otherwise removing second knot 106. Since second knot 106 is on the rear side of paddle 12, second knot 106 will not substantially interfere with ball 14 bouncing on front surface 24 of paddle 12 and/or front surface 58 of front panel 50. Notably, even where front panel 50 is included, ball 14 is considered to bounce off of and/or be hit by front surface 24 of paddle 12 since paddle 12, not front panel 50, generally defines the resistive structure capable of deflecting/hitting ball 14 to cause a bounce of ball 14 therefrom.

To facilitate manufacture of transaction product 10 and/or to facilitate packaging of transaction product 10, in one embodiment, string 16 is tightly secured around paddle 12. For example, as illustrated in FIGS. 1-7 and the enlarged detail view of FIG. 10, string 16 is secured to define a first length 110, a wrapped portion 112, and a free length 114. String 16 is pulled taught to position ball 14 immediately adjacent and held tightly against front surface 24 of paddle 12 or front surface 58 of front panel 50. First length 110 extends from aperture 46 in paddle 12 and extends linearly down toward handle 22 where string 16 is wrapped around handle 22 of paddle 12 a number of times, e.g., three times, to form wrapped portion 112. Once wrapped around handle 22, second end 102 of string 16 is pulled to a rear of paddle 12 and threaded from a bottom of wrapped portion 112 up between wrapped portion 112 and rear surface 26 of paddle 12, in one embodiment, between wrapped portion 112 and rear surface 78 of rear panel 70. In one embodiment, second end 102 extends out of wrapped portion 112 just before the last wrap of string 16 around handle 22 to secure string 16 in place such that free length 114 of string 16 extends from wrapped portion 112. To further secure string 16 in place, in one embodiment, a wrap or sleeve 116 is placed around both free length 114 and a lower portion of first length 110 as illustrated, for example, in FIGS. 3 and 10. In one embodiment, sleeve 116 is transparent or translucent.

Figure 11:
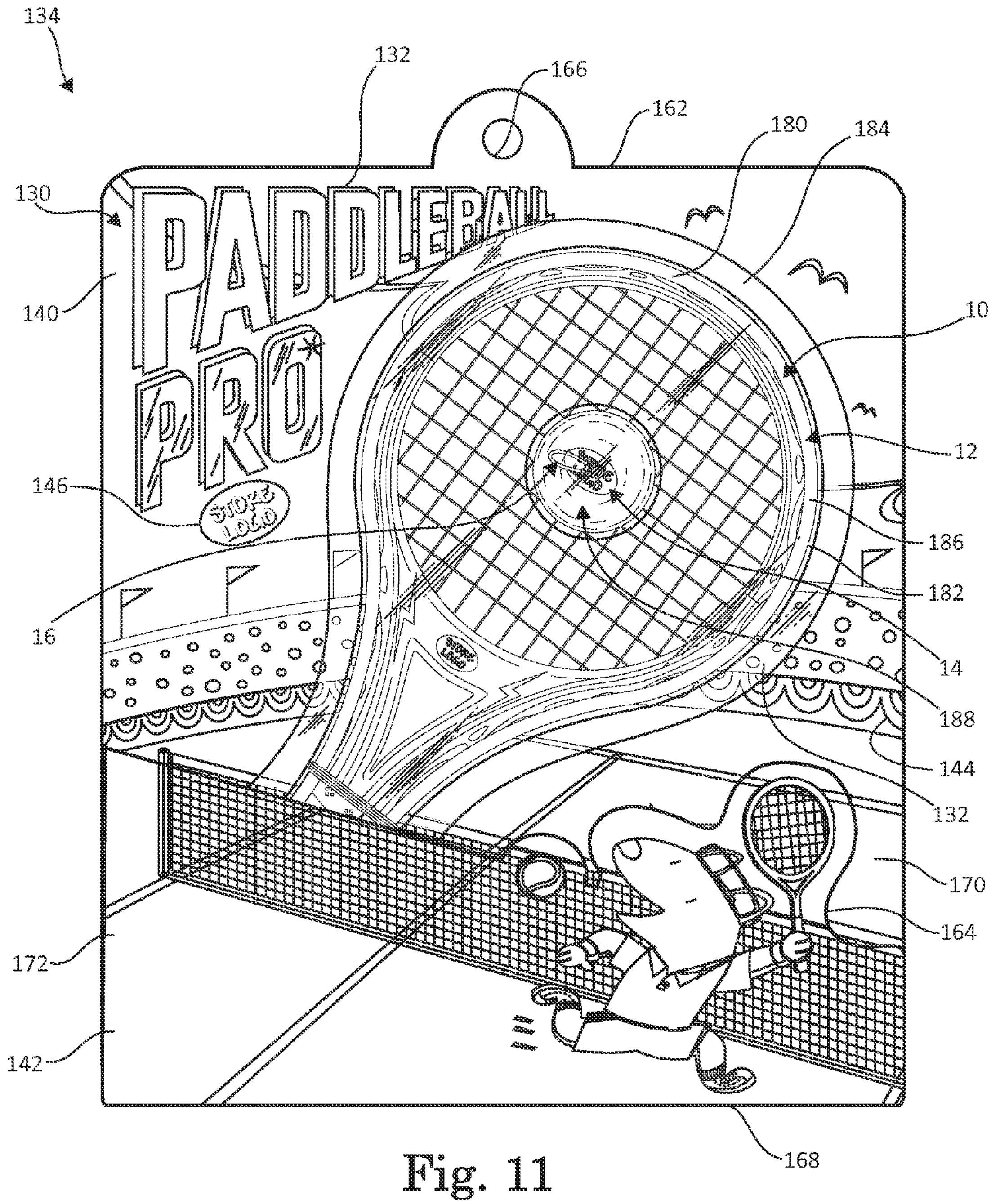
FIG. 11 is a front view illustration of a packaged transaction product assembly including the transaction product of FIG. 1, according to one embodiment of the present invention.
Figure 12:
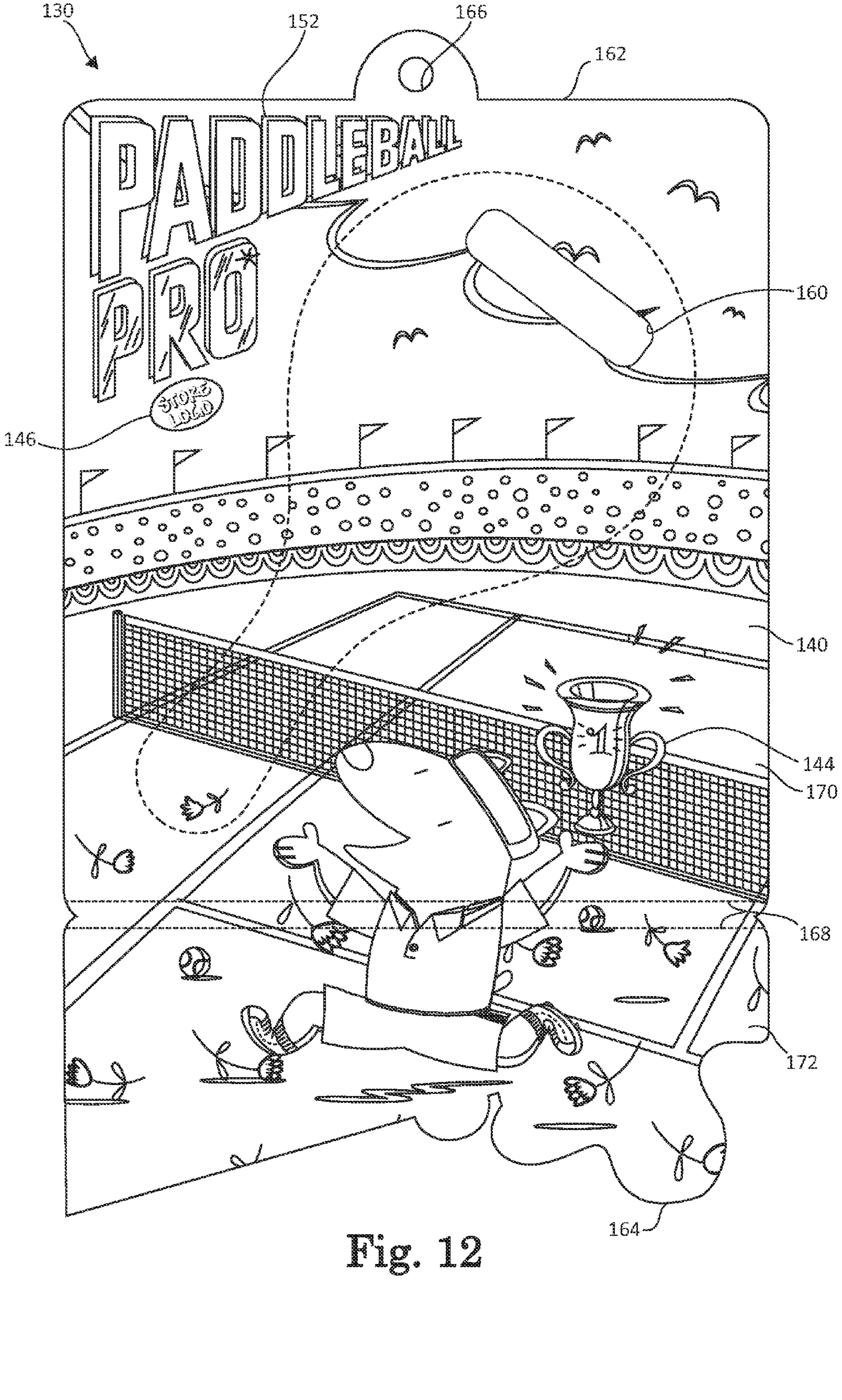
FIG. 12 is a front view illustration of an unfolded backer of the transaction product assembly of FIG. 11, according to one embodiment of the present invention.
Figure 13:
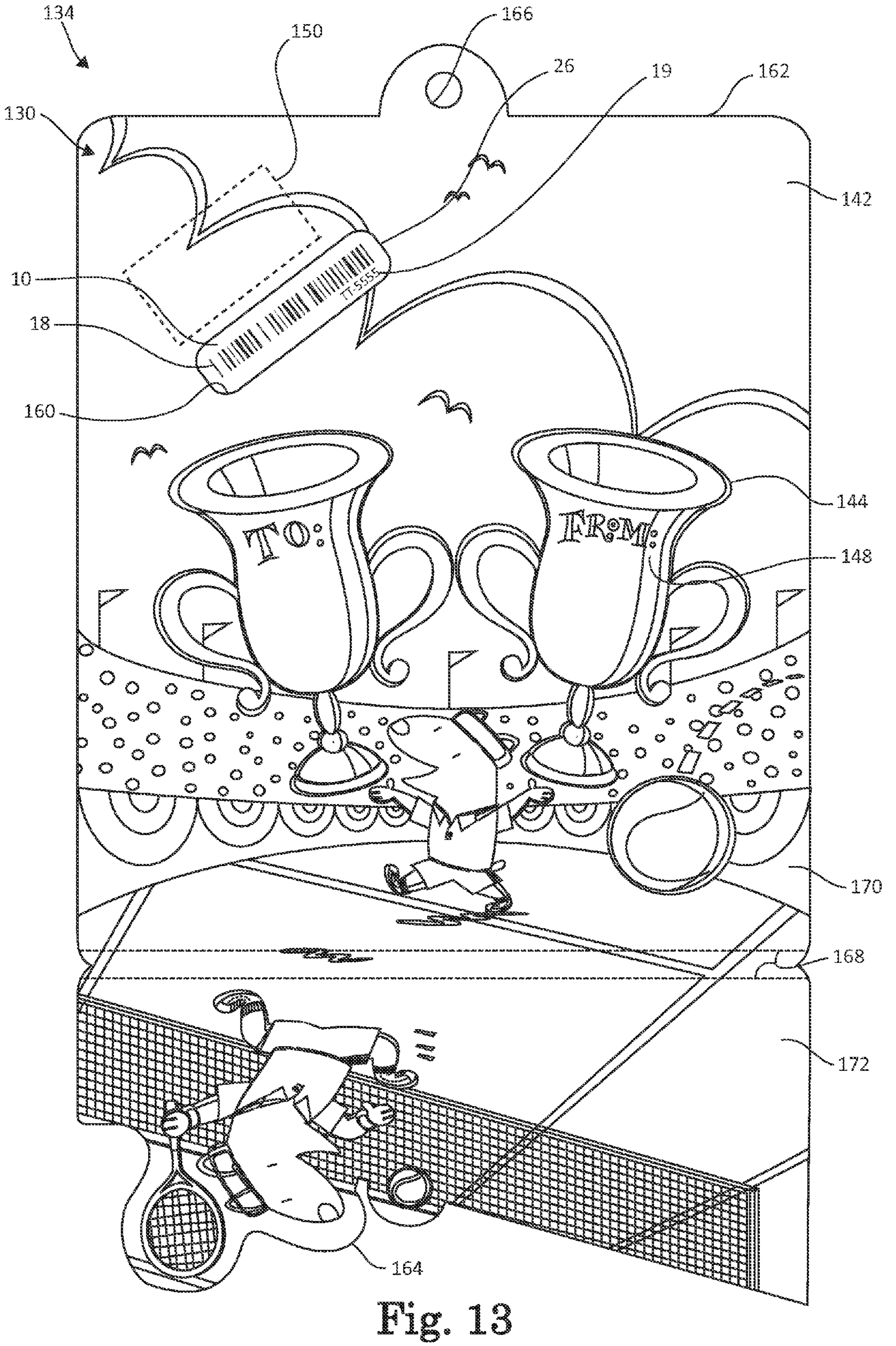
FIG. 13 is a rear view illustration of the transaction product assembly of FIG. 11 with an unfolded backer, according to one embodiment of the present invention.

As illustrated in FIGS. 11-13, transaction product 10 is supported on a carrier or backer 130 via a blister 132 to form a packaged transaction product assembly 134. Referring, for example, to the front view of FIG. 12 and the rear view of FIG. 13, backer 130 comprises a single layer or multiple layers of paper or plastic material, for example, generally in the form of a relatively stiff but bendable/flexible card. Use of other materials is also contemplated. In one embodiment, backer 130 defines a first or front surface 140 and a second or rear surface 142 positioned opposite front surface 140, where the front as described with respect to backer 130 refers to a surface configured to face potential consumers when positioned in a retail display. In one example, one or both of front surface 140 and rear surface 142 are substantially planar. Backer 130 displays indicia, graphics or text information including store logo(s), store name(s), slogans, advertising, instructions, directions, brand indicia, promotional information, holiday indicia, seasonal indicia, media format identifiers, characters and/or other information.

For example, in one embodiment, backer 130 includes decorative indicia 144, which makes backer 130 more aesthetically pleasing to potential consumers, and also ties the visual aesthetic of backer 130 to the appearance of transaction product 10, e.g., to decorative indicia 60 on front panel 50 and rear panel 70. For instance, decorative indicia 144 provide background scenery or other related graphics to a common theme of transaction product 10. In the illustrated embodiment, where decorative indicia 60 depict transaction product 10 as a tennis racquet, decorative indicia 144 provides a tennis scene with a character playing tennis, etc.

In one embodiment, backer 130 includes brand indicia 146, which identify a store, brand, department, etc. and/or services associated with transaction product 10, and, in one example are similar to brand indicia 62 and/or 94. In one example, backer 130 includes indicia 148 including "to," "from," and "amount" fields. The fields of indicia 148 provide areas of backer 130 configured to be written upon by a consumer to personalize backer 130 for presentation as a gift to a particular recipient, for a particular purpose, and/or to indicate a value of transaction product 10.

In one embodiment, backer 130 includes redemption indicia 150, generally indicated by a dashed box in FIG. 12, indicating that transaction product 10 is redeemable for the purchase of goods and/or services and that upon use, a value of the purchased goods and/or services will be deducted from the financial account or record linked to transaction product 10. In one embodiment, redemption indicia 150 include phrases such as "<NAME OF STORE> GiftCard" and "This GiftCard is redeemable for merchandise or services at any of our stores or at our web site," and/or provides help or phone line information in case of a lost, stolen, or damaged transaction product, etc.

Figure 10:
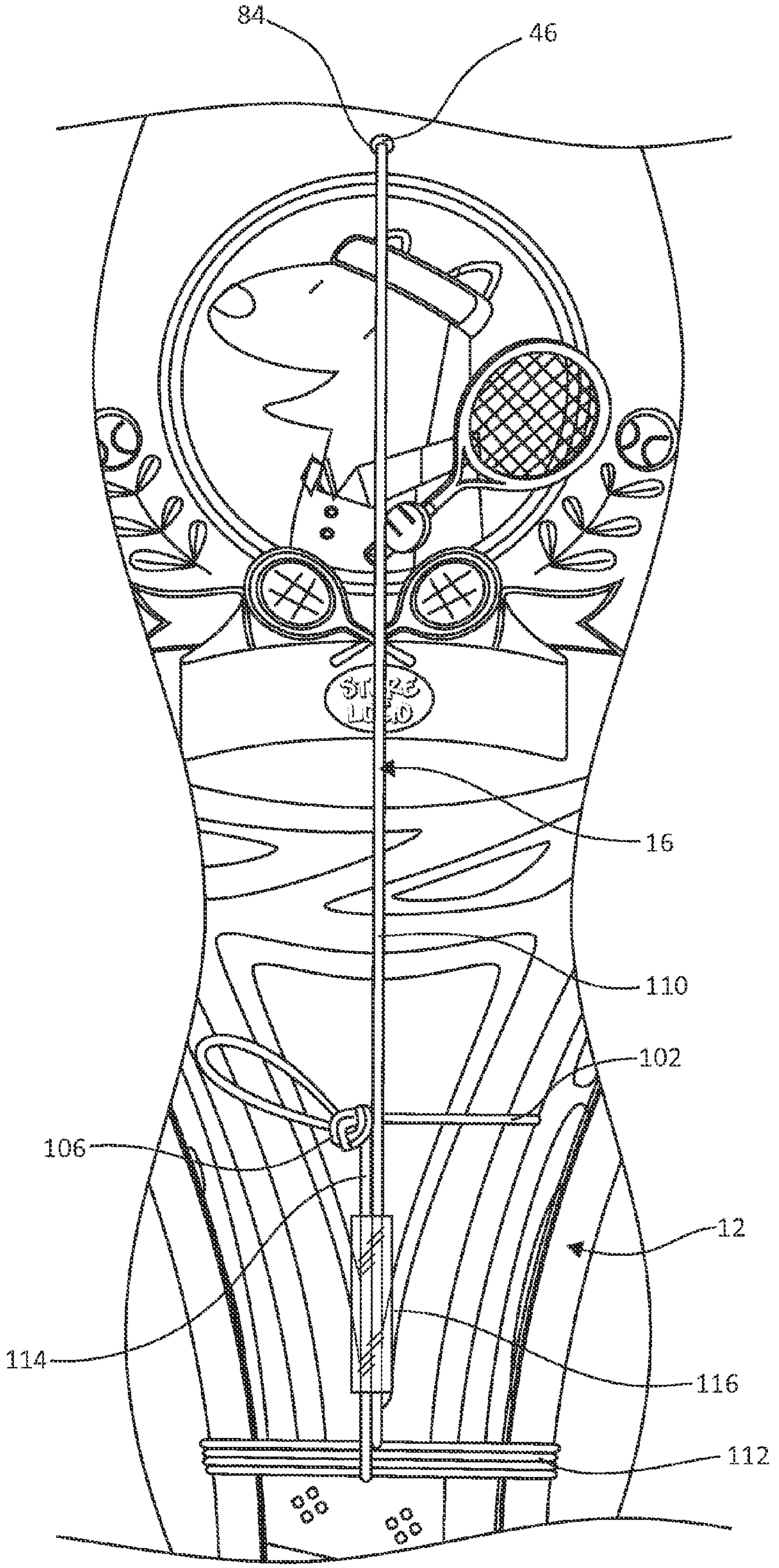
FIG. 10 is an enlarged, detail view of a portion of the rear view illustration of FIG. 3, according to one embodiment of the present invention.

As illustrated in FIG. 10, in one example, promotional indicia 152 advertise the non-transactional or amusing functionality of transaction product 10. In one embodiment, promotional indicia 152 generally indicate to a bearer of packaged transaction product assembly 134 that transaction product 10 can be used as a toy by bouncing ball 14 on paddle 12. As such, promotional indicia 152 further promote the sale of transaction product 10 by drawing the attention of a potential consumer to the non-transactional and amusing feature(s) of packaged transaction product 10.

Any of indicia 60, 62, 80, 94, 144, 146, 148, 150, and 152 and/or other indicia optionally may appear anywhere on backer 130 or transaction product 10. Additional information besides that specifically described and illustrated herein may also be included and/or one or more of indicia 60, 62, 80, 94, 144, 146, 148, 150, and 152 may be eliminated.

In one embodiment, backer 130 includes a window or opening 160 for displaying account identifier 18 of transaction product 10 therethrough as illustrated in FIG. 13. As previously described, account identifier 18 is adapted for accessing an account or a record associated with transaction product 10 for activating, loading value to or debiting value from the account or record. In one example, transaction product 10 is coupled with or positioned adjacent front surface 140 (FIGS. 11 and 12) of backer 130, and a bearer viewing rear surface 142 (FIG. 13) of backer 130, which is opposite front surface 140, can view or access account identifier 18 through opening 160. Accordingly, opening 160 allows viewing or other access to account identifier 18 to activate and/or load transaction product 10 without removing transaction product 10 from backer 130. In one embodiment (not shown), a portion of backer 130 alternatively is configured to be folded away from the remainder of backer 130 to access account identifier 18 without removing transaction product 10 from backer 130. Other foldable or non-foldable backers can be used having various sizes and shapes for supporting transaction product 10.

In one embodiment, backer 130 defines a top edge 162 and an opposite, bottom edge 164. Near top edge 162, backer 130 defines an aperture 166 or hook configured to receive a support rod or similar structure in a retail display such that backer 130, and therefore, packaged transaction product assembly 134 as a whole, can be hung therefrom. In one embodiment, bottom edge 164 of backer 130 is defined to substantially follow an outline of decorative indicia 144 near the bottom of rear surface 142 of backer 130 in a non-linear manner. One or more fold lines 168 are defined by backer 130 near a lower portion thereof to divide backer 130 into a first or top section 170 and a second or bottom section 172. Bottom section 172 of backer 130 folds up around fold line(s) 168 to cover a portion of top section 170 such that a portion of rear surface 142 defined by bottom section 172 is viewable along with a portion of front surface 140 defined by top section 170 when packaged transaction product assembly 134 is viewed from the front as illustrated in FIG. 11. In one embodiment, the portion of top section 170 covered by bottom section 172 when bottom section 172 is so folded is less than about 75% and, in one embodiment, is less than about 50% (i.e., half) of the top section 170.

In one embodiment, decorative indicia 144 on the portion of rear surface 142 defined by bottom section 172 that is viewable in FIG. 11 correspond with decorative indicia 144 on the portion of front surface 140 defined by top section 170 and are viewable in FIG. 11 to form a synergistic scene. In one embodiment, e.g., where two fold lines 168 are included, folded bottom section 172 is positioned in front of and spaced from the portion of front surface 140 visible in FIG. 11, and the bottom edge 164 of backer 130 is positioned so the synergist scene takes on a partially three-dimensional effect, which further contributes to the promotional draw and functionality of the packaged transaction product assembly 134.

Other variations in the formation of backer 130 will be apparent to those of skill in the art upon reading the present application.

Blister 132 is vacuum formed or otherwise molded from transparent and/or translucent plastic (e.g., polyvinyl chloride) or other suitable material to define a cavity 182 sized and shaped to specifically receive transaction product 10. More particularly, in one embodiment, blister 132 is in the form of a plastic shell defining cavity 182, which includes a paddle section 186 and a ball section 188, and a perimeter flange 184 extending around cavity. Perimeter flange 184 defines a substantially planar rear surface (not shown) of blister 132 configured to be adhered or otherwise coupled to front surface 140 of backer 130.

Paddle section 186 of blister 132 defines a relatively thin section of cavity 182 adjacent to but forwardly offset from perimeter flange 184. Paddle section 186 is sized and shaped to receive paddle 12 of transaction product 10 and to generally maintain transaction product 10 in place within first cavity portion 180. In one embodiment, ball section 188 is centered with respect to an enlarged portion of paddle section 186 and is sized, shaped, and positioned to receive ball 14 when it is pulled against paddle 12 in the position illustrated in FIGS. 1-7. As such, ball section 188 is concave and rounded to generally follow the contour of ball 14 extending from paddle 12.

Figure 14:
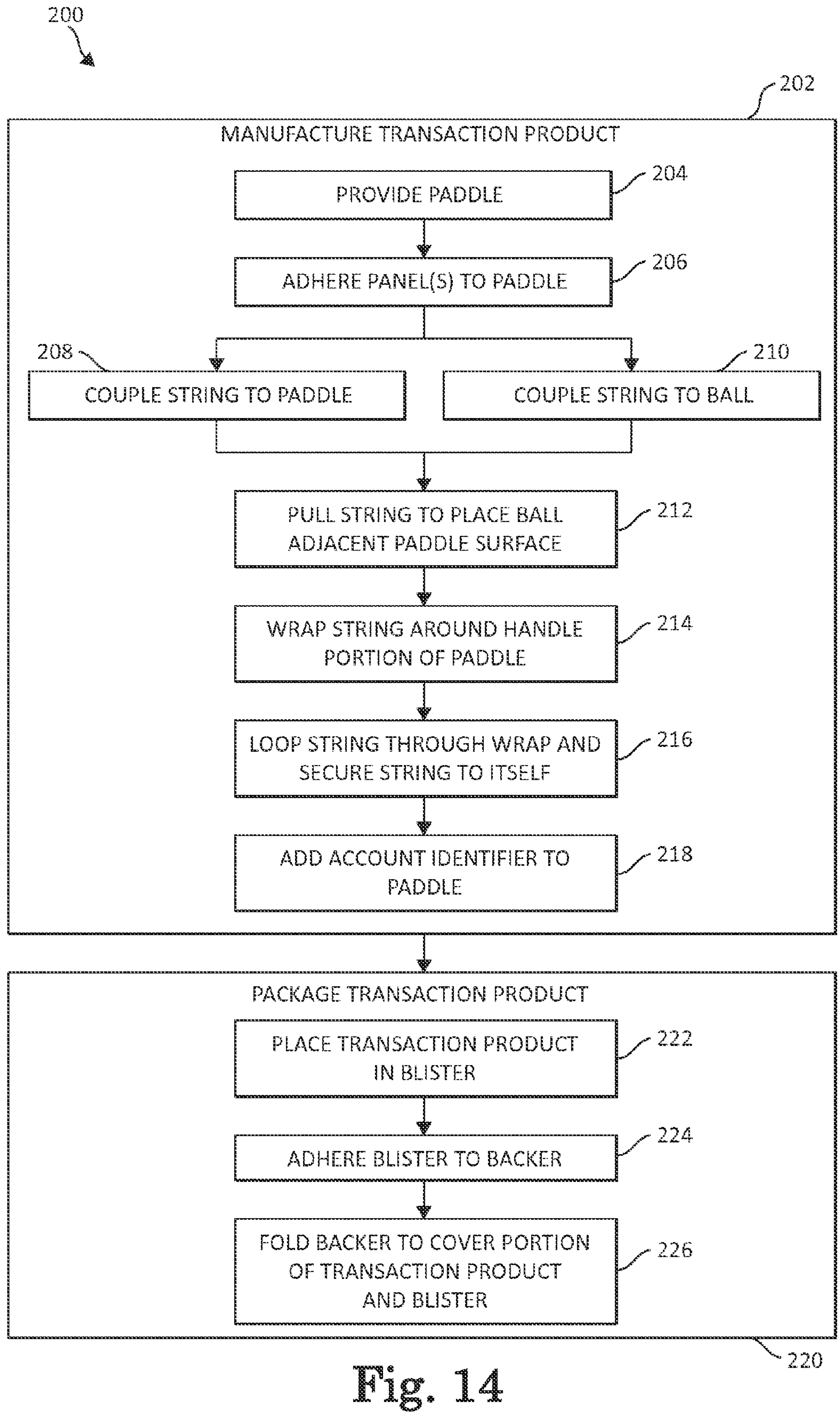
FIG. 14 is a flow chart illustrating a method of assembling a transaction product assembly, according to one embodiment of the present invention.

FIG. 14 is a flow chart illustrating a method of assembling transaction product 10 as generally indicated at 200. At 202, transaction product 10 is manufactured. For example, at 204, paddle 12 is provided via injection molding or other suitable formation process or via receipt from an outside paddle vendor (not shown).

Figure 8:
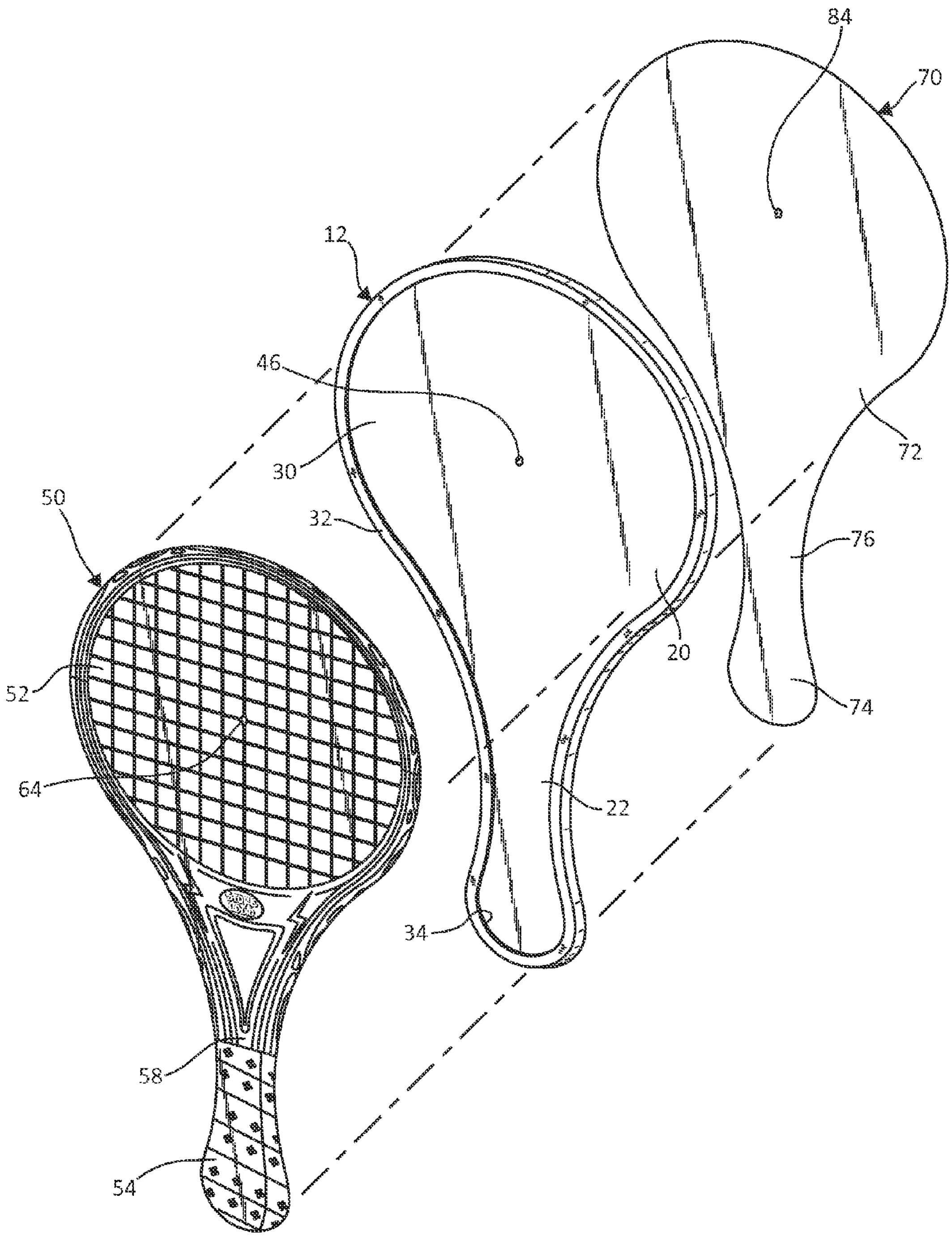
FIG. 8 is an exploded, perspective view illustration of a paddle and panels of the transaction product of FIG. 1, according to one embodiment of the present invention.

At 206, front and rear panels 50 and 70 are secured to major, substantially planar sections 30 and 40 of front and rear surfaces 24 and 26 of paddle 12, respectively, as illustrated, for example, in FIGS. 8 and 9 via adhesive or other suitable coupling agent. At 208, string 16 is coupled to paddle 12, for example, by tying second end 102 of string 16 in second knot 106 on the rear side of paddle 12 such that string 16 extends away from second knot 106 through aperture 46 in paddle 12. At 210, which may occur before, after, or simultaneously with operation 208, string 16 is coupled to ball 14, for example, by tying first end 100 of string 16 in a first knot 104 on one side of ball 14 with string extending away from first knot 104 through hole 92 in ball 14. Other methods of coupling string 16 to ball 14 and/or paddle 12 will be apparent to those of skill in the art upon reading this application.

After string 16 is coupled to paddle 12 and ball 14, then at 212, string 16 is pulled rearwardly through aperture 46 of paddle 12 to position ball 14 directly adjacent front surface 24 of paddle 12 or front surface 58 of front panel 50. At 214, string 16 is pulled downwardly from aperture 46 toward handle 22 of paddle 12 to define a first length 110 and is subsequently wrapped around handle 22 a number of times, e.g., three times, to form wrapped portion 112 of string 16. At 216, second end 102 of string 16 is looped through wrapped portion 112 of string 16 to at least partially secure string 16 in place relative to paddle 12 and extend away from wrapped portion 112 to define a free length 114 extending from wrapped portion 112 to second end 102 of string 16. In one embodiment, operation 216 includes further securing string 16 in place relative to paddle 12 by placing sleeve 116 around first length 110 and free length 114 of string 16.

After string 16 is secured in place, account identifier 18 is added to transaction product 10. In one embodiment, where account identifier 18 is a bar code, transaction product 10 with string 16 wrapped around paddle 12 as described above is moved through printing machines to print the bar code, in one example, a different, unique bar code, to each transaction product 10. The wrapping of string 16 and securement of string 16 around paddle 12 allows transaction product 10 as a whole to be moved through printing machines, which, in one embodiment, is more efficient than printing paddle 12 with account identifier 18 and then coupling string 16 with ball 14 thereto since printing often occurs at a different facility than the facility that assembles paddle 12, ball 14, and string 16. Therefore, printing a fully assembled transaction product 10 may save the time and expense of sending printed paddles back to the first facility for additional assembly. One of skill in the art will recognize that similar considerations and processes would also apply to the application of RFID tags, magnetic strips, and other forms of account identifier 18 to paddle 12. In one embodiment, account identifier 18 is alternatively added through opening 160 in backer 130 (i.e., after operation 220 described below) such that no assembly of packaged transaction product assembly 134 is performed after account identifier 18 is added.

At 220, transaction product 10 is packaged for retail sale. More specifically, at 222, transaction product 10 is placed in cavity 182 of blister 132, for example, by placing ball 14 in ball portion 188 of cavity 182 and paddle 12 in paddle portion 186 of cavity 182. When so positioned, rear surface 26, even rim 42, is fully positioned within cavity 182 and offset at least slightly from a rear surface (not shown) of perimeter flange 184.

At 224, rear surface (not shown) of perimeter flange 184 of blister 132 is positioned on front surface 140 of backer 130 and secured thereto. For instance, in one example, heat and pressure are applied to perimeter flange 184 and backer 130 to activate heat-seal adhesive on the rear surface of perimeter flange 184. Other suitable coupling methods may also be used.

In one embodiment, at 226, bottom section 172 of backer 130 is folded forwardly and upwardly about fold line(s) 168 to cover a portion of transaction product 10, e.g., a portion of paddle 12, and blister 132 as illustrated in FIG. 11. In one embodiment, the portion of transaction product 10 or paddle 12 covered by bottom section 172 when bottom section 172 is so folded is less than about 75% and, in one embodiment, is less than about 50% (i.e., half) of transaction product 10 and/or paddle 12.

When so folded, decorative indicia 144 on rear surface 142 of bottom section 172 is positioned in front of and is visible concurrently with decorative indicia 144 on front surface 140 of top portion and decorative indicia 60 on front surface 58 of front panel 50 applied to paddle 12 to create a synergistic visual presentation with varying levels of depth, thereby, increasing the visual interest of packaged transaction product assembly 134 and promoting sale of packaged transaction product assembly 134 to potential consumers who view packaged transaction product assembly 134. Once fully assembled, packaged transaction product 10 is ready for retail display, etc.

Figure 15:
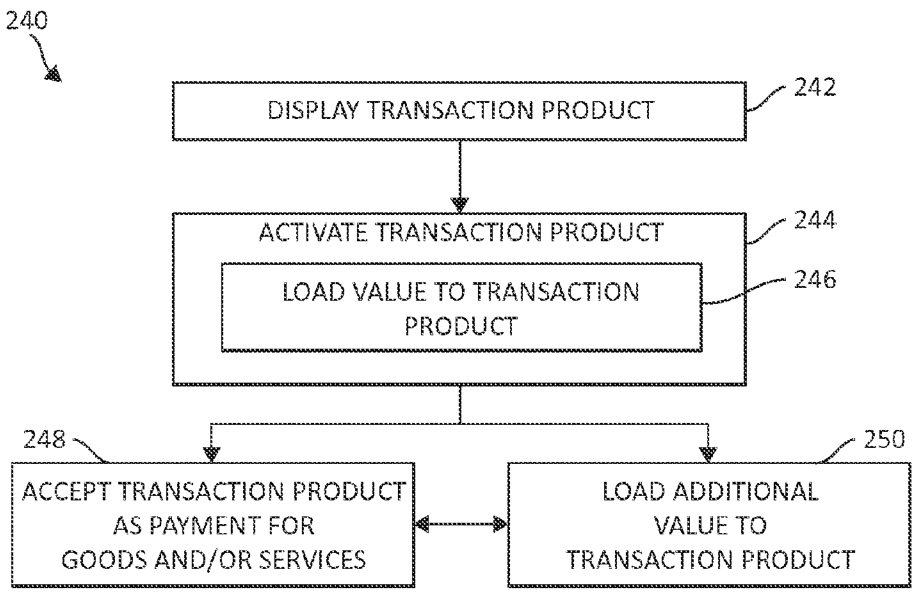
FIG. 15 is a flow chart illustrating a method of encouraging purchase and facilitating use of a transaction product assembly, according to one embodiment of the present invention.

FIG. 15 is a flow chart illustrating one embodiment of a method 240 of encouraging purchase and facilitating use of transaction product 10 by consumers and/or recipients. At 242, transaction product 10 is placed on or hung from a rack, shelf, or other similar device to display transaction product 10 for sale to potential consumers, for example, via backer 130 where transaction product 10 is displayed as part of packaged transaction product assembly 134. In one embodiment, a depiction of transaction product 10 is additionally or alternatively placed on a website for viewing and purchase by potential consumers.

At 244, a consumer who has decided to purchase transaction product 10 presents transaction product 10 alone or as part of packaged transaction product assembly 134 to a retail store employee, retail store kiosk, remote terminal, or other person or device to scan account identifier 18 using a point-of-sale terminal or other machine to access an account or record linked to account identifier 18. In particular, account identifier 18 is scanned or otherwise accessed, for example through opening 160 of backer 130 to activate packaged transaction product assembly 134, more particularly, transaction product 10 and the account or record linked thereto. Upon accessing the account or record, then, at 246, value is added to the account or record in the form of monetary value, points, minutes, etc. Thus, transaction product 10 is activated and loaded for use toward one or more purchases of goods and/or services.

In one example, a predetermined value is associated with transaction product 10 (i.e., associated with the account or record linked to transaction product 10 via account identifier 18) prior to activation and display, but such predetermined value is not initially available for use toward the purchase or use of goods and/or services. In such an embodiment, at 244, transaction product 10 is activated to permit subsequent access to the predetermined value (e.g., subsequent loading on and debiting from the account or record) and no additional value is added during activation such that operation 246 may be eliminated.

Once transaction product 10 is activated and loaded, transaction product 10 can be used by the consumer or any other bearer of transaction product 10 to purchase goods and/or services at the affiliated retail setting (e.g., a retail store or website) or can be used in exchange for calling minutes, etc. In one embodiment, where transaction product 10 is displayed on a website at 242, then, at 244, transaction product 10 may be activated in any suitable method and may not require the physical scanning of account identifier 18 to be activated or to otherwise access the associated account or record such as at 246.

In one example, at 248, the retail store or other affiliated retail setting or website accepts transaction product 10 as payment toward the purchase of goods and/or services made by the current bearer of transaction product 10. In particular, the value currently loaded on transaction product 10 (i.e., stored or recorded in the account or record linked to account identifier 18) is applied toward the purchase of goods and/or services. At 250, additional value is optionally loaded on transaction product 10 at a point-of-sale terminal, kiosk or other area of the retail store or related setting either during the same or during a subsequent transaction than the transaction in which transaction product 10 is accepted at 248. Upon accepting transaction product 10 as payment at 248, the retail store or related setting can subsequently perform either operation 248 or operation 250 as requested by a current bearer of transaction product 10. Similarly, upon loading additional value on transaction product 10 at 250, the retail store or related setting can subsequently perform either operation 250 again or operation 248. In one example, the ability to accept transaction product 10 as payment for goods and/or services is limited by whether the account or record associated with transaction product 10 has any value stored or recorded therein at the time of attempted redemption.

Figure 16:
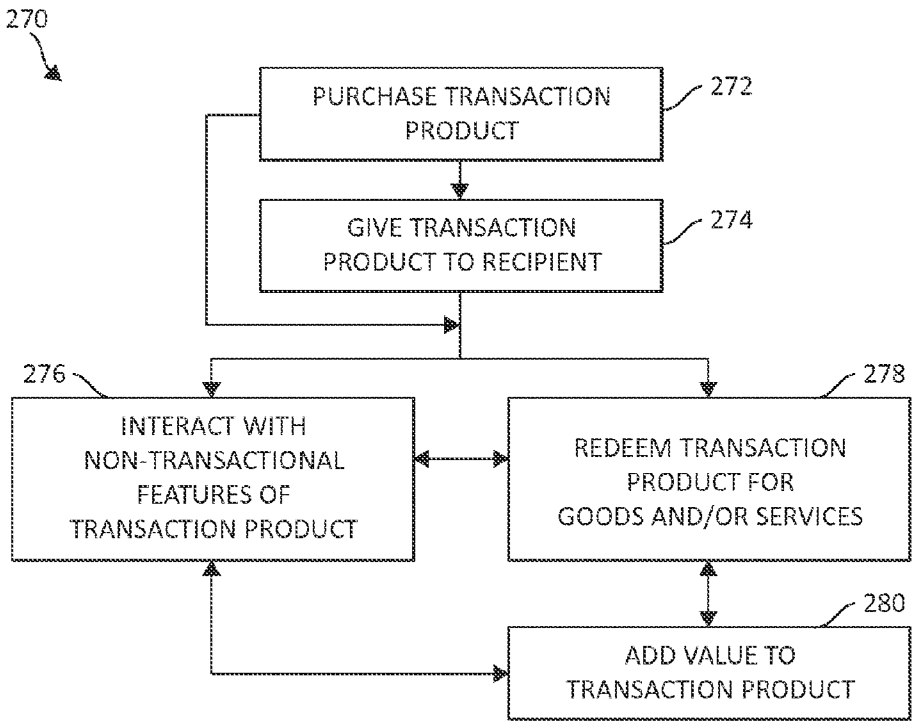
FIG. 16 is a flow chart illustrating a method of using a transaction product assembly, according to one embodiment of the present invention.

FIG. 16 is a flow chart illustrating one embodiment of a method 270 of using transaction product 10 (e.g., FIGS. 1-7). At 272, a potential consumer of transaction product 10, which is displayed in a retail store or viewed on a website, decides to and does purchase transaction product 10, for example, as part of packaged transaction product assembly 134 from the retail store or website. Upon purchasing transaction product 10, a retail store employee, a retail store kiosk or other person or device scans account identifier 18 (FIGS. 3 and 12) through opening 160 of backer 130 or otherwise reads or accesses account identifier 18. Upon accessing account identifier 18, the account or record linked to account identifier 18 is accessed and activated to load value onto transaction product 10 (i.e., load value to the account or record associated with transaction product 10). In one embodiment, such as where transaction product 10 is purchased at 272 via a website, actual scanning or other mechanical detection of account identifier 18 may be eliminated. Please note that for purposes of this application, the term "purchase" as used with respect to purchasing transaction product 10 and/or packaged transaction product assembly 134 does not imply that a price in addition to the value added to the associated account or record must be tendered, but rather completion of the transaction of activating and loading transaction product 10 such that transaction product 10 is free to leave the store with the consumer.

At 274, the consumer optionally gives transaction product 10, for example, as part of packaged transaction product assembly 134, to a recipient, such as a graduate, relative, friend, expectant parents, one having a recent or impending birthday, a couple having a recent or impending anniversary, etc. In one embodiment, a plurality of transaction product 10 are purchased and given to partygoers, such as at a birthday party, etc. as party favors or gifts. As an alternative, the consumer can keep transaction product 10 for his or her own use thereby eliminating operation 274.

At 276, the consumer, recipient, or other current bearer of transaction product 10 interacts with the non-transactional features thereof for amusement. More specifically, in one example, the bearer of transaction product 10 removes transaction product 10 from backer 130 and blister 132, unwraps string 16 from around paddle 12, and begins to or attempts to begin to successively bounce ball 14 on front surface 24, more particularly, front surface 58 of front panel 50 covering front surface 24, in an amusing and challenging manner.

At 278, the consumer or recipient redeems transaction product 10 for goods and/or services from the retail store or website. At 280, the consumer or recipient of transaction product 10 optionally adds value to transaction product 10, more particularly, to the account or record associated with account identifier 18 included therewith, at the retail store or over the Internet (i.e., via the website). Upon interacting with the non-transaction feature of transaction product 10 at 276, redeeming transaction product 10 at 278 or adding value to transaction product 10 at 280, the consumer or recipient of transaction product 10 subsequently can perform any of operations 276, 278, or 270 as desired. In one embodiment, the ability of the consumer or recipient to repeat redeeming transaction product 10 at 278 is limited by whether the account or record linked with transaction product 10 has any remaining value stored or recorded therein at the time of attempted redemption.

Although described above as occurring at a single retail store or website, in one embodiment, purchasing transaction product 10 at 272, redeeming transaction product 10 at 278, and adding value to transaction product 10 at 280, can each be performed at any one of a number of stores adapted to accept transaction product 10 or over the Internet. In one example, a number of stores are each part of a chain or are similarly branded stores. In one example, a number of stores include at least one website and/or at least one conventional brick and mortar store.

Transaction cards and other products come in many forms, according to embodiments of the invention. Stored-value cards, like other transaction cards, can be "re-charged" or "re-loaded" at the direction of the original consumer, the gift recipient or a third party. The term "loading on" or "loaded on" herein should be interpreted to include adding to the balance of an account or record associated with a transaction card. The balance associated with the transaction card declines as the card is used, encouraging repeat visits or use. The card remains in the user's purse or wallet, serving as an advertisement or a reminder to revisit the associated merchant. Stored-value cards according to embodiments of the invention provide a number of advantages to both the consumer and the merchant. Other stored-value cards and transaction cards according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are meant for illustrative purposes only and should not be considered to limit the invention. Various alternatives and changes will be apparent to those of ordinary skill in the art. Other modifications within the scope of the invention and its various embodiments will be apparent to those of ordinary skill.

What is claimed is:

1. A combination comprising:

a transaction product comprising:

a paddle defining an enlarged portion and an elongated handle extending from the enlarged portion, the paddle being formed as a single piece of material;

a string defining a first end and a second end opposite the first end, the first end of the string being coupled to the paddle;

a ball coupled to the second end of the string, the ball being configured to bounce on the paddle; and an account identifier statically connected to the paddle, wherein the account identifier links the paddle to at least one of an account and a record and is machine readable by a point-of-sale terminal;

a backer supporting the transaction product for display in a retail setting; and a blister defining a paddle portion, a ball portion extending from an internal part of the paddle portion, and a perimeter flange extending around the paddle portion;

wherein:

the backer defines a first substantially planar surface, the ball and the paddle are positioned in the ball portion and the paddle portion of the blister, respectively, and the perimeter flange is coupled to the first substantially planar surface of the backer such that the paddle, the ball, and the string are enclosed between the backer and the blister.

2. The combination of claim 1, wherein the account identifier is a bar code.

3. The combination of claim 1, wherein the account identifier includes at least one of a bar code, a magnetic strip, a smart chip, and a radio frequency identification (RFID) device.

4. The combination of claim 1, further comprising a database storing the at least one of the account and the record, wherein the database tracks a monetary value, and the monetary value is available for use toward a price of a future purchase and is associated with the at least one of the account and the record.

5. The combination of claim 1, wherein:

the paddle defines a first surface including a major, substantially planar section, a rim extending around a perimeter of the major, substantially planar section, and an offset between the major, substantially planar section and the rim, the transaction product further comprises a substantially planar panel having a size and a shape substantially identical to a size and a shape of the major, substantially planar section, the substantially planar panel being adhered to the major, substantially planar section, and the rim extends farther away from the major, substantially planar section than the substantially planar panel extends from the major, substantially planar section.

6. The combination of claim 5, wherein:

the major, substantially planar section is a first major, substantially planar section, the rim is a first rim, the offset is a first offset, and the substantially planar panel is a first substantially planar panel, the paddle defines a second surface opposite the first surface, the second surface including a second major, substantially planar section, a second rim extending around a perimeter of the second major, substantially planar section, and a second offset between the second major, substantially planar section and the second rim, the transaction product further comprises a second substantially planar panel having a size and a shape substantially identical to a size and a shape of the second major, substantially planar section, the second substantially planar panel being adhered to the second major, substantially planar section, and the second rim extends farther away from the second major, substantially planar section than the second substantially planar panel extends from the second major, substantially planar section, wherein the second rim extends from the second major, substantially planar section in a direction opposite a direction the first rim extends from the first major, substantially planar section.

7. The combination of claim 6, wherein the account identifier is secured to the second substantially planar panel.

8. The combination of claim 7, wherein the account identifier is a bar code printed to the second substantially planar panel.

9. The combination of claim 1, wherein:

the paddle defines a first side, a second side opposite the first side, and an aperture extending through the enlarged portion, the ball is positioned on the first side of the paddle adjacent the aperture, and the string extends from the ball through the aperture, down the second side of the paddle, and is wrapped around the elongated handle such that the ball is held tightly against the first side of the paddle.

10. The combination of claim 9, wherein:

the string defines a wrapped portion wrapped around the elongated handle, a first length extending from the aperture to the wrapped portion, and a free length extending from the wrapped portion to the second end of the string, and the transaction product includes a sleeve extending around portions of each of the first length and the free length of the string coupling the first length and the free length of the string to one another.

11. The combination of claim 1, wherein:

the backer defines a front surface, a rear surface opposite the front surface, and a free edge that is substantially non-linear, the paddle is secured to the front surface of the backer, and a portion of the backer including the free edge is folded forwardly to cover a portion of the paddle, wherein the portion is less than half of the paddle.

12. The combination of claim 11, wherein:

the backer includes an opening, and the paddle is positioned on the front surface of the backer such that the account identifier is viewable through the opening.

13. A combination comprising:

a stored-value item comprising:

a rubber sphere;

substantially rigid means for deflecting the rubber sphere causing the rubber sphere to bounce when the rubber sphere impacts the substantially rigid means for deflecting;

means for tethering the rubber sphere to the substantially rigid means for deflecting; and means for linking the substantially rigid means for deflecting with at least one of an account and a record having a value associated therewith such that the stored-value item can be used as payment toward a purchase of one or more of goods and services, wherein the means for linking is machine readable by a point-of-sale terminal and is statically secured to the substantially rigid means for deflecting; and means for supporting the stored-value item to hang from a display support, wherein the means for supporting includes means for revealing the means for linking of the stored-value item through the means for supporting;

wherein:

the means for supporting defines at least one fold line dividing the means for supporting into a first section and a second section, the second section is folded about the at least one fold line to cover a portion of the first section and to enclose a portion of the means for deflection between the first section and the second section of the means for supporting, and the portion of the means for deflecting is less than about half of the means for deflecting.

14. The combination of claim 13, wherein the means for tethering is configured to wrap around the substantially rigid means and itself to secure the rubber sphere adjacent to the substantially rigid means for deflecting and for maintaining the means for tethering close to the substantially rigid means for deflecting along an entire length of the substantially rigid means for deflecting.

15. The combination of claim 14, wherein:

the substantially rigid means for deflecting defines recesses on opposite sides of the substantially rigid means for deflecting, and the stored-value item further includes:

means for displaying aesthetic enhancements to stored-value item, the means for displaying being positioned within a first one of the recesses and adhered to the substantially rigid means for deflecting, and means for supporting the means for linking, the means for supporting being positioned within a second one of the recesses and adhered to the substantially rigid means for deflecting.

16. The combination of claim 13, in combination with: and means for securing the stored-value item to the means for supporting including means for covering a side of the stored-value item opposite the means for supporting, the means for covering being one of translucent and transparent.

17. A method of providing a financial transaction product, the method comprising:

providing a paddle defining an enlarged portion, a handle extending from the enlarged portion, and an aperture extending through the enlarged portion;

providing a ball;

providing a string having first and second ends, the first end of the string being coupled to ball, the second end of the string extending through the aperture in the paddle and secured around the handle of the paddle such that the ball is held tightly against the enlarged portion of the paddle and the string is maintained in close proximity to the paddle, and the paddle, ball, and string are all part of the financial transaction product;

adding an account identifier to the paddle while the ball is held tightly against the enlarged portion of the paddle and the string is maintained in close proximity to the paddle, wherein the account identifier includes machine readable information identifying a financial account having a value available toward a price of a future purchase;

securing the paddle to a backer such a first portion of the backer substantially covers a first side of the paddle and the account identifier is accessible while the paddle is secured to the backer; and folding the backer about at least one fold line such that a second portion of the backer, which is located on an opposite side of the at least one fold line of the backer as compared to the first portion of the backer, covers a part of a second side of the paddle opposite the first side of the paddle, and the part is less than about half the paddle.

18. The method of claim 17, wherein:

the account identifier includes a bar code, and the adding the account identifier includes printing the bar code to the paddle while the paddle is coupled to the ball via the string.

19. The method of claim 17, wherein securing the paddle to the backer includes positioning the paddle, the ball, and the string between the backer and a blister, wherein:

the blister is vacuum formed to conform to the shape of the financial transaction product when the ball is held tightly against the enlarged portion of the paddle and the string is maintained in close proximity to the paddle, and the backer includes an aperture providing access to the account identifier on the paddle through the aperture in the backer.

20. A method of encouraging purchase and facilitating use of a paddle linked to a record or an account, the method comprising:

displaying the paddle coupled to a ball via a string within a package such that at least the ball and the paddle are visible to a potential consumer, the package includes a substantially planar carrier, and the paddle defines an external surface placed adjacent to the substantially planar carrier such that the substantially planar carrier extends beyond a footprint of the paddle on all sides of the paddle, and a front panel of the substantially planar carrier folds over a front of the paddle opposite the external surface of the paddle placed adjacent to the substantially planar carrier to cover more than half of the front of the paddle, wherein:

an account identifier is rigidly coupled to the external surface of the paddle, the account identifier linking the paddle to the record or the account stored on a remote database and having a value associated therewith such that the paddle can be used as at least partial payment toward at least one future purchase, and the package is configured to allow visual access to the account identifier while the paddle is coupled to the substantially planar carrier; and activating the record or the account linked to the paddle to permit subsequent deductions from the value associated with the record or the account for application as the at least partial payment toward the at least one future purchase based on the account identifier of the paddle, wherein activating includes reading the account identifier from the paddle while the paddle is coupled to the substantially planar carrier using a point-of-sale terminal.

21. The method of claim 20, wherein:

the external surface of the paddle is a first external surface of the paddle, the paddle defines a second external surface opposite the first external surface, and displaying the paddle coupled to a ball via a string includes displaying the ball held tightly against the second external surface of the paddle, the string extending from the ball, down the first external surface and being wrapped around the paddle to secure the ball tightly against the second external surface of the paddle and the string around the paddle.

* * * * *